C. D. ISAACSON.
PERFORATED MUSIC SHEET.
APPLICATION FILED JULY 3, 1913.
1,322,448.
Patented Nov. 18, 1919.
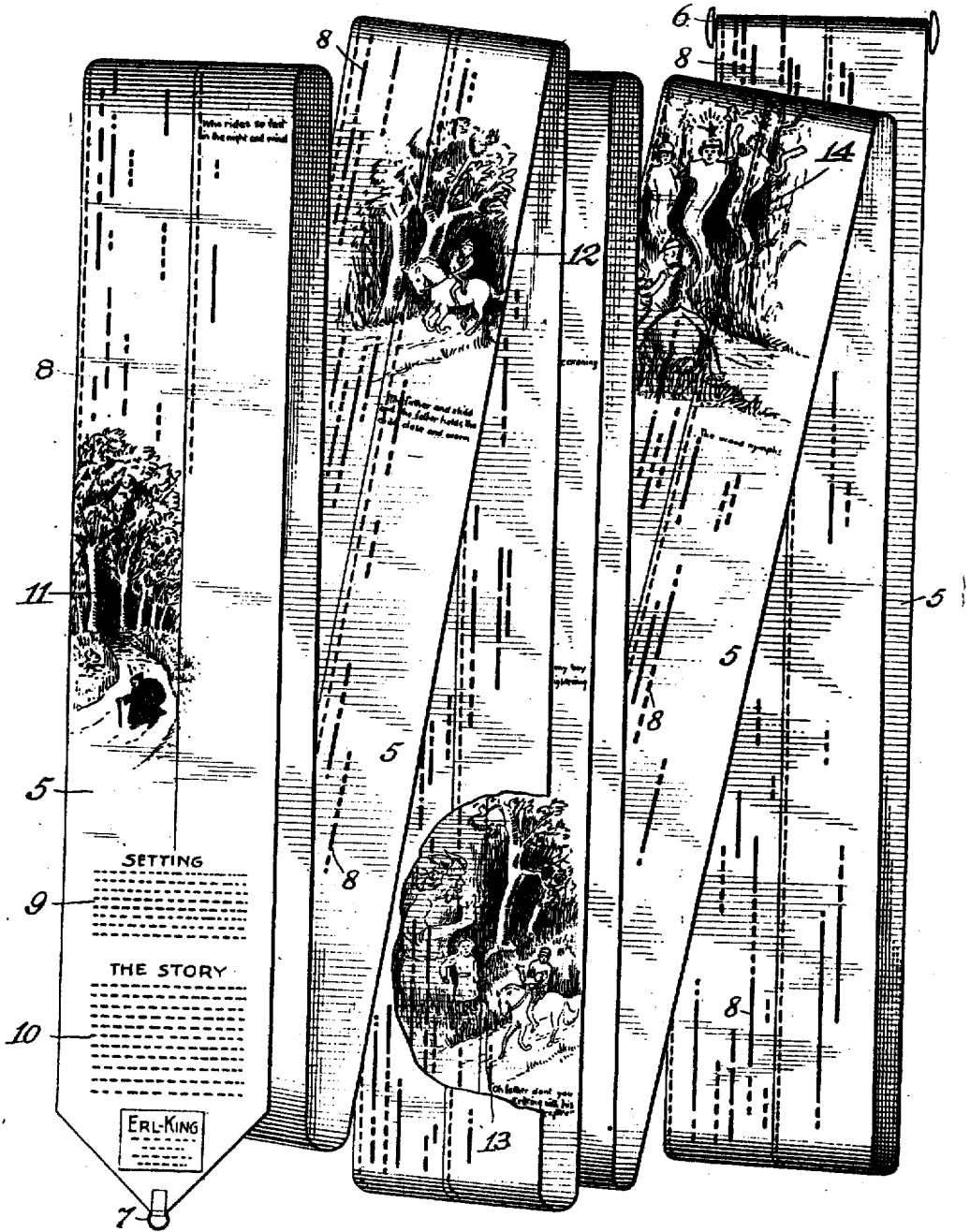

UNITED STATES PATENT OFFICE.

CHARLES D. ISAACSON, OF BROOKLYN, NEW YORK.

PERFORATED MUSIC-SHEET.

1,322,448.                                           Specification of Letters Patent.         Patented Nov. 18, 1919

Application filed July 3, 1913. Serial No. 777,272.

*To all whom it may concern:*

Be it known that I, CHARLES D. ISAACSON, a citizen of the United States, residing at Brooklyn, in the county of Kings and State of New York, have invented new and useful Improvements in Perforated Music-Sheets, of which the following is a specification.

This invention relates to music record sheets such as are used on so called self-playing musical instruments for controlling the operating mechanism thereof, and consists in providing such sheets with certain distinguishing characters, marks or imprints that will assist the operator in giving a more correct and intelligent interpretation of the music.

The object of the invention is to provide music record sheets, such as are wound on rolls, with means such as a concise verbal description of the particular selection, setting forth in words, an interpretation of the story which the composer has rendered in musical notation. In addition to this verbal description, there will be printed on or attached to the record sheet at various places throughout its length and at suitable points to correspond with the musical theme, pictures, descriptive of the music at the points where applied.

A record sheet provided with this invention will enable the average person to more correctly interpret the music as conceived by the composer than could possibly be done with the plain sheet. Before starting to play he would read the story and immediately understand the basic idea in the composer's mind when he wrote the music, the time, place, conditions and other details which will stimulate the imagination of the player, bring before him a mental picture of the whole musical subject and arouse within him the proper "feeling" necessary in order to get the best results from the music. This condition of the player is kept up and further stimulated by means of a series of appropriate illustrations applied to the record sheet at suitable points throughout the length of the sheet and, if desired, suitable suggestive phrases and short sentences explanatory of the story, and that also tend to enlighten the mind of the player may be printed in different places on the sheet throughout its length.

In the accompanying drawing which represents a music record sheet partly unrolled and loosely folded to show the features of the invention, 5 indicates a long sheet or strip of paper attached at one end to a roll 6 upon which it is wound for preservation and having a ring 7 at its other end for connecting the record sheet to a second roll by means of which the sheet is fed over the tracker board of the musical instrument. Perforations 8 of various lengths are made in the sheet 5, as usual, to control the playing of the instrument and the length of the individual notes. Besides these perforations there is generally found on the face of the sheet a continuous, irregular dotted line by which the expression of the piece being played is governed, and accompanying letters such as F., P., MF., etc., to indicate that certain parts are to be played loud, soft, moderately loud, etc. These usual marks of expression while assisting a person to interpret the music, do so more or less mechanically. There is nothing in connection with such guides to put a player in touch with the music, to explain, to illustrate, to arouse the imagination and the emotions, and to elevate a player to the same height as that upon which the composer stood when writing the music.

It is well known that music, in common with poetry and prose, is an expression of the emotions, an outpouring of one's thoughts and imaginations based on a foundation of fact or fiction; in other words, a story or narrative of a truth, a legend, or a concept originating in the mind of the author. From the fact that a story expressed musically appeals to the finer, more refined, and higher sensibilities, the correct interpretation or reading of a musical composition is thereby rendered more difficult for the average person whose imagination does not reach the high plane occupied by the author.

A person may, by following the usual expression marks printed on the record sheet, play correctly a piece of music in proper time and loudly, softly and moderately as called for by the composer, without understanding what he is playing, or why he plays it as marked. One principal reason is, he does not know the story of the composition and is following a trail blindly, his imagination lies dormant, his soul is not aroused, and, therefore, his playing is without feeling or expression, it is cold and mechanical.

To overcome this difficulty and put every player in touch with the composer by making him acquainted with the story told by the music, the scene or setting of the story, and to arouse and stimulate his imagination and fill his mind with the spirit, the intent, the soul of the music, there will be printed on or attached to each record sheet at the beginning a short verbal description of the musical selection on the sheet in two parts, arranged as follows:

*The setting.*—This is a brief description of the time, place and all other details understood by the word "setting," the purpose being to place the player in the proper frame of mind to appreciate and absorb the story.

*The story.*—This is a brief verbal description told consecutively giving a clear interpretation of the composer's theme.

In addition to the verbal description the story will be further set forth and explained as the music progresses by a series of appropriate illustrations printed on or attached at various points throughout the length of the sheet, the pictures showing graphically what the music attempts to narrate at the various points where applied.

To make clear the invention, the drawing, which represents a record sheet perforated for the well known composition "The Erl-King" by Schubert, arranged by Liszt, may have in addition to said perforations, the usual dotted line and other well known marks of expression, none of which are shown. At the beginning of the record sheet there is printed at 9 the "setting," reading as follows:

A road through a forest to which the superstitious have credited mysterious legends and supposed to be the home of the Erl-King. A very dark night—the wind blows dismally and all the spirits of the fairy world seem to be gathered.

This places the person playing in the proper frame of mind to appreciate and understand the story and arouses within him the right feeling. Not knowing the music, he may have imagined a bright, sunshiny happy scene, but after reading the setting the current of his thoughts immediately changes and a dark, dismal picture fills his mind and he knows that the music must be played slowly and in a moody, desolate tone. Following this at the point 10 is the story:

A father is carrying his tiny son to the doctor's and his way lies through the forest. The child in its feverish state imagines he hears the Erl-King and his daughter—who beckon the little one to come. "My daughter will dance and sing for you. Come, dear boy, come with me. You shall only play. Flowers are all about in my place and my mother has a golden legend." And the boy tells his father of the Erl-King, but the parent in calm tones soothes him and spurs the horse faster. The ride becomes a fiery one and at the end the boy dies—answering the call of the Erl-King.

Having read the story carefully, the player can proceed with the music, knowing what the composer seeks to describe, the spirit of his work, and therefore, knows what the notes mean. Without this foreknowledge, the music would simply appeal to him as a pleasant, harmonious arrangement of chords, without meaning other than that suggested by the name.

To maintain the player in this frame of mind, and gradually increase the emotions thus aroused, a series of pictures are printed on or attached to the record sheet at various points, each picture illustrating in the most graphic manner the story as told by the music at that particular point. These pictures appear in succession as the record sheet unrolls and at just the right time to present to the eye in the simplest and clearest manner possible the feeling and expression the composer wishes imparted to the music.

In the instance shown, the first picture 11 at the beginning of the music shows a dismal forest scene. The next 12, a little farther on, shows a father on horseback holding a boy. The next picture 13 attempts to show "The Erl-King" (the Forest King) as he appeared to the boy in his delirium, beckoning to him, and his daughter. The next 14 attempts to show the mountain nymphs in dance as the boy's heated imagination sees them. Then comes the last picture at the close of the roll, again showing the forest, dense, dark, and dismal. These pictures are like the pictures in a story or any picture book. They visualize for the player that which he would have never seen otherwise.

These descriptive pictures will first of all enable a player to interpret the music with truer expression and ability. The music furthermore will have more meaning to him and give him more pleasure than he could obtain from a non-illustrated record sheet. As pictures were among the first means employed by early man to preserve and convey his thoughts to others, so at the present time pictures tell a story that would otherwise remain unknown to many who do not care for written descriptions, or cannot understand them, but who enjoy looking at pictures. It is thought therefore, that music record sheets illustrated as described, will help to make classical music, now so generally shunned by the uninitiated because not understood, more appreciated, sought after, and loved by the masses.

As a further means of assisting the player to understand and correctly interpret the music, suggestive phrases and sentences may be used throughout the music sheet, being printed wherever they are likely to produce the desired effect. Such expressions as the following may be used in The Erl-King.

Who rides so fast in the night and wind;
The father and child—and the father
holds the child close and warm;
My son, what makes you so pale?
Oh, father, don't you see the Erl-King, with his crown and scepter?
No, no my boy—it's only the lightning.
The Erl-King is beckoning;
He tells of his wonders;
Oh, father, don't you hear the Erl-King?
No. my boy, it's only the wind:
Again the Erl-King uses his marvelous powers of persuasion. His daughter promises to dance and sing.

The father spurs on his horse and it flees at rapid pace. The wind groans and moans. It grows even darker.

But, too late—the child is dead.

This invention is adaptable to all music record sheets which travel continuously in one direction, and will apply to any selection of music of any nature placed on such sheets.

What I claim is:—

1. A music sheet provided at selected intervals with suitable perforations for the rendition of a specific musical composition when said sheet is employed in conjunction with an automatically operated musical instrument, said perforations, of themselves, being devoid of such characteristics as would suggest to the player the composer's conception of the emotional interpretation of the composition and a series of pictorial representations carried by the sheet and placed in suitable relation to certain groups of the perforations, and visually indicative and mentally suggestive of the composer's conception of the emotional interpretation of the composition represented by the said groups of perforations.

2. A music sheet adapted to be wound in the form of a roll and provided at selected intervals with suitable perforations for the rendition of a specific musical composition when said sheet is employed in conjunction with an automatically operated musical instrument, said perforations, of themselves, being devoid of such characteristics as would suggest to the player the composer's conception of the emotional interpretation of the composition, a series of pictorial representations applied to the sheet in succession throughout its length and adapted to be successively displayed to the player as the roll is unwound, said pictorial representations being placed in suitable relation to certain groups of the perforations and being visually indicative and mentally suggestive of the composer's conception of the emotional interpretation of the composition represented by the said groups of perforations, said sheet having thereon at the beginning a verbal description of the story or the theme of the musical composition, and short descriptive word phrases or explanatory sentences provided upon said sheet in such places as will assist the player to more fully understand and interpret the composition and parts thereof.

3. Means for visually creating emotional interpretations to the player of the composer's conception of a musical composition during its rendition on an automatically-operated musical instrument controlled by a music sheet having perforations adapted to produce the tonal characteristics of the composition when operated in such instrument, said means consisting in providing the sheet with a series of pictorial representations characterized by their appeal to the emotions and positioned in proper relation to selected groups of perforations, each representation visually indicating the conception of the emotional interpretation of that portion of the composition covering the particular group, whereby the player will receive mental emotional suggestions of the controlling thought or thoughts to be interpreted and permit the player to manually control the instrument operations to musically interpret the suggestions.

4. A note sheet for an automatic player, having displayed adjacent to the area devoted to the note-sheet-controlling perforations, a visual exposition or interpretation of the musical scenes represented by the perforations.

5. In a structure such as defined in claim 4, such visual exposition or interpretation consisting in a recital in words of the scenes, occurrences and experiences constituting such exposition or interpretation.

6. A music sheet perforated to control the tonal production of musical selections in automatically-operated musical instruments, said sheet having pictorial representations on its face at spaced points in the length of the sheet to expose the representations individually and in predetermined succession, said representations being respectively located relatively to predetermined perforations or groups of perforations to provide visual pictorial interpretation of the dominant characteristics which are designed to be associated with the rendition of the particular portion of the selection provided by the perforation or group of perforations with which the representation is associated.

7. A music sheet perforated to control the tonal production of musical selections in automatically-operated musical instruments, said sheet having pictorial representations on its face at spaced points in the length of the sheet to expose the representations individually and in predetermined succession, said representations being respectively located relatively to predetermined perforations or groups or perforations to provide visual pictorial interpretation of the dominant characteristics which are designed to be associated with the rendition of the particular portion of the selection provided by the perforation or group of perforations with which the representation is associated, said sheet also bearing verbal notations pertaining to the subject matter of the selection and the representations individually or collectively.

In testimony whereof I have hereunto set my hand in presence of two subscribing witnesses.

CHARLES D. ISAACSON.

Witnesses:
J. GRANVILLE MEYERS,
E. H. BICKERTON.